United States Patent
Yao et al.

(10) Patent No.: US 9,678,609 B2
(45) Date of Patent: Jun. 13, 2017

(54) ORTHOGONAL FREQUENCY SCAN SCHEME IN TOUCH SYSTEM

(71) Applicant: Apple Inc., Cupertino, CA (US)

(72) Inventors: Weijun Yao, San Jose, CA (US); Ahmad Al-Dahle, Santa Clara, CA (US); Yingxuan Li, Saratoga, CA (US); Wei Hsin Yao, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 178 days.

(21) Appl. No.: 14/059,411

(22) Filed: Oct. 21, 2013

(65) Prior Publication Data

US 2015/0109212 A1  Apr. 23, 2015

(51) Int. Cl.
*G06F 3/041* (2006.01)
*G06F 3/044* (2006.01)

(52) U.S. Cl.
CPC ............ *G06F 3/044* (2013.01); *G06F 3/0416* (2013.01)

(58) Field of Classification Search
None
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |

(Continued)

FOREIGN PATENT DOCUMENTS

| | | |
|---|---|---|
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Jennifer Mehmood
*Assistant Examiner* — Stephen T Reed
(74) *Attorney, Agent, or Firm* — Morrison & Foerster LLP

(57) ABSTRACT

Systems and processes for stimulating a touch sensor panel using orthogonal frequencies are provided. In one example process, the drive lines of the touch sensor panel can be stimulated with stimulation signals having orthogonal frequencies. The orthogonal frequencies can be separated by a frequency that is inversely proportional to an integration time of the touch sensor panel. The touch signals generated in response to the stimulation signals can be amplified, converted into digital form, demodulated using the orthogonal frequencies, and integrated over the integration time. Integrating the demodulated signals over a length of time that is inversely proportional to the frequency spacing between the orthogonal frequencies reduces or eliminates interference in the touch signals caused by the stimulation signals having different frequencies.

22 Claims, 12 Drawing Sheets

(56) References Cited

U.S. PATENT DOCUMENTS

| | | | |
|---|---|---|---|
| 7,663,607 | B2 | 2/2010 | Hotelling et al. |
| 8,479,122 | B2 | 7/2013 | Hotelling et al. |
| 8,547,359 | B2 | 10/2013 | Souchkov |
| 8,982,091 | B1* | 3/2015 | Mohindra ............... G06F 3/044 345/173 |
| 2006/0197753 | A1 | 9/2006 | Hotelling |
| 2010/0060591 | A1 | 3/2010 | Yousefpor et al. |
| 2010/0060593 | A1* | 3/2010 | Krah .................... G06F 3/0416 345/173 |
| 2011/0084857 | A1* | 4/2011 | Marino .................. G06F 3/044 341/5 |
| 2011/0261006 | A1 | 10/2011 | Joharapurkar et al. |
| 2012/0056841 | A1* | 3/2012 | Krenik .................. G06F 3/044 345/174 |
| 2012/0086656 | A1 | 4/2012 | Hung et al. |
| 2012/0105325 | A1 | 5/2012 | Brosnan et al. |
| 2013/0050130 | A1 | 2/2013 | Brown |
| 2014/0145997 | A1 | 5/2014 | Tiruvuru |
| 2014/0327644 | A1* | 11/2014 | Mohindra ............... G06F 3/044 345/174 |
| 2014/0347122 | A1 | 11/2014 | Hong |
| 2015/0091845 | A1 | 4/2015 | Park |
| 2015/0109213 | A1 | 4/2015 | Yao et al. |
| 2015/0338952 | A1 | 11/2015 | Shahparnia |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Non-Final Office Action mailed Mar. 3, 2015, for U.S. Appl. No. 14/059,427, filed Oct. 21, 2013, 12 pages.

Non-Final Office Action mailed Mar. 28, 2016, for U.S. Appl. No. 14/059,427, filed Oct. 21, 2013, eight pages.

Final Office Action mailed Oct. 8, 2015, for U.S. Appl. No. 14/059,427, filed Oct. 21, 2013, 13 pages.

Non-Final Office Action mailed Feb. 22, 2016, for U.S. Appl. No. 14/286,949, filed May 23, 2014, 15 pages.

Final Office Action mailed Sep. 28, 2016, for U.S. Appl. No. 14/286,949, filed May 23, 2014, 17 pages.

Final Office Action mailed Jan. 5, 2017, for U.S. Appl. No. 14/059,427, filed Oct. 21, 2013, nine pages.

* cited by examiner

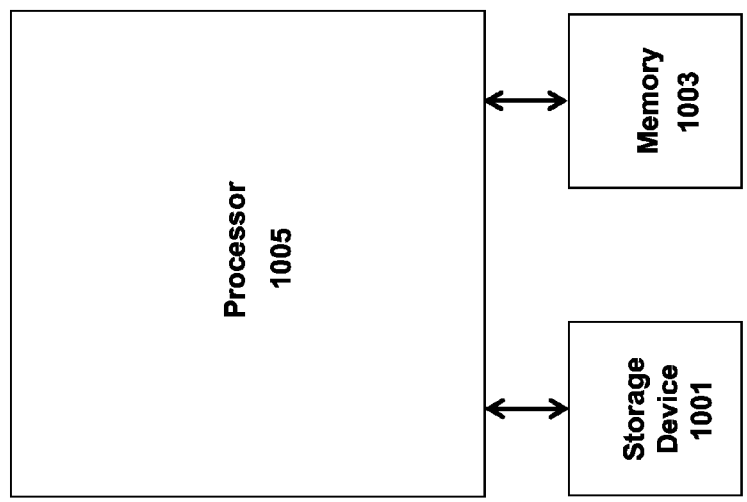

Personal Device 1200

Personal Device 1100

Personal Device 1400

Personal Device 1300

ORTHOGONAL FREQUENCY SCAN SCHEME IN TOUCH SYSTEM

FIELD

This relates generally to touch sensitive devices and, more specifically, to scanning a touch sensor of a touch sensitive device.

BACKGROUND

Touch sensitive devices have become popular as input devices to computing systems due to their ease and versatility of operation as well as their declining price. A touch sensitive device can include a touch sensor panel, which can be a clear panel with a touch sensitive surface, and a display device, such as a liquid crystal display (LCD), that can be positioned partially or fully behind the panel or integrated with the panel so that the touch sensitive surface can cover at least a portion of the viewable area of the display device. The touch sensitive device can allow a user to perform various functions by touching the touch sensor panel using a finger, stylus, or other object at a location often dictated by a user interface (UI) being displayed by the display device. In general, the touch sensitive device can recognize a touch event and the position of the touch event on the touch sensor panel, and the computing system can then interpret the touch event in accordance with the display appearing at the time of the touch event, and thereafter can perform one or more actions based on the touch event.

Some touch sensor panels can include an array of touch regions or nodes formed at the crossing points between rows of drive lines and columns of sense lines. To sense a touch at the touch sensor, the drive lines can be driven by alternating current (AC) stimulation signals to capacitively couple with the crossing sense lines, thereby forming a capacitive path for coupling charge from the drive lines to the sense lines. The crossing sense lines can output touch signals representing the coupled charge or current. In some implementations, the stimulation signals used to stimulate each drive line can have the same frequency. However, to differentiate between the stimulation signals of the drive lines, each stimulation signal can have a different phase offset. While this technique can be used to effectively detect touch or hover events on smaller touch sensitive devices, the time required to scan the touch sensor panel for the touch or hover events can become undesirably long on larger devices.

SUMMARY

Systems and processes for stimulating a touch sensor panel using orthogonal frequencies are provided. In one example process, the drive lines of the touch sensor panel can be stimulated with stimulation signals having orthogonal frequencies. The orthogonal frequencies can be separated by a frequency that is inversely proportional to an integration time of the touch sensor panel. The touch signals generated in response to the stimulation signals can be amplified, converted into digital form, demodulated using the orthogonal frequencies, and integrated over the integration time. Integrating the demodulated signals over a length of time that is inversely proportional to the frequency spacing between the orthogonal frequencies can reduce or eliminate interference in the touch signals caused by the stimulation signals having different frequencies.

BRIEF DESCRIPTION OF THE DRAWINGS

FIG. 10 illustrates an exemplary system for stimulating a touch sensor using orthogonal frequencies according to various examples.

DETAILED DESCRIPTION

In the following description of examples, reference is made to the accompanying drawings in which it is shown by way of illustration specific examples that can be practiced. It is to be understood that other examples can be used and structural changes can be made without departing from the scope of the various examples.

This relates to systems and processes for stimulating a touch sensor panel using orthogonal frequencies. In one example process, the drive lines of the touch sensor panel can be stimulated with stimulation signals having orthogonal frequencies. The orthogonal frequencies can be separated by a frequency that is inversely proportional to an integration time of the touch sensor panel. The touch signals generated in response to the stimulation signals can be amplified, converted into digital form, demodulated using the orthogonal frequencies, and integrated over the integration time. Integrating the demodulated signals over a length of time that is inversely proportional to the frequency spacing between the orthogonal frequencies can reduce or eliminate interference in the touch signals caused by the stimulation signals having different frequencies.

Figure 1:
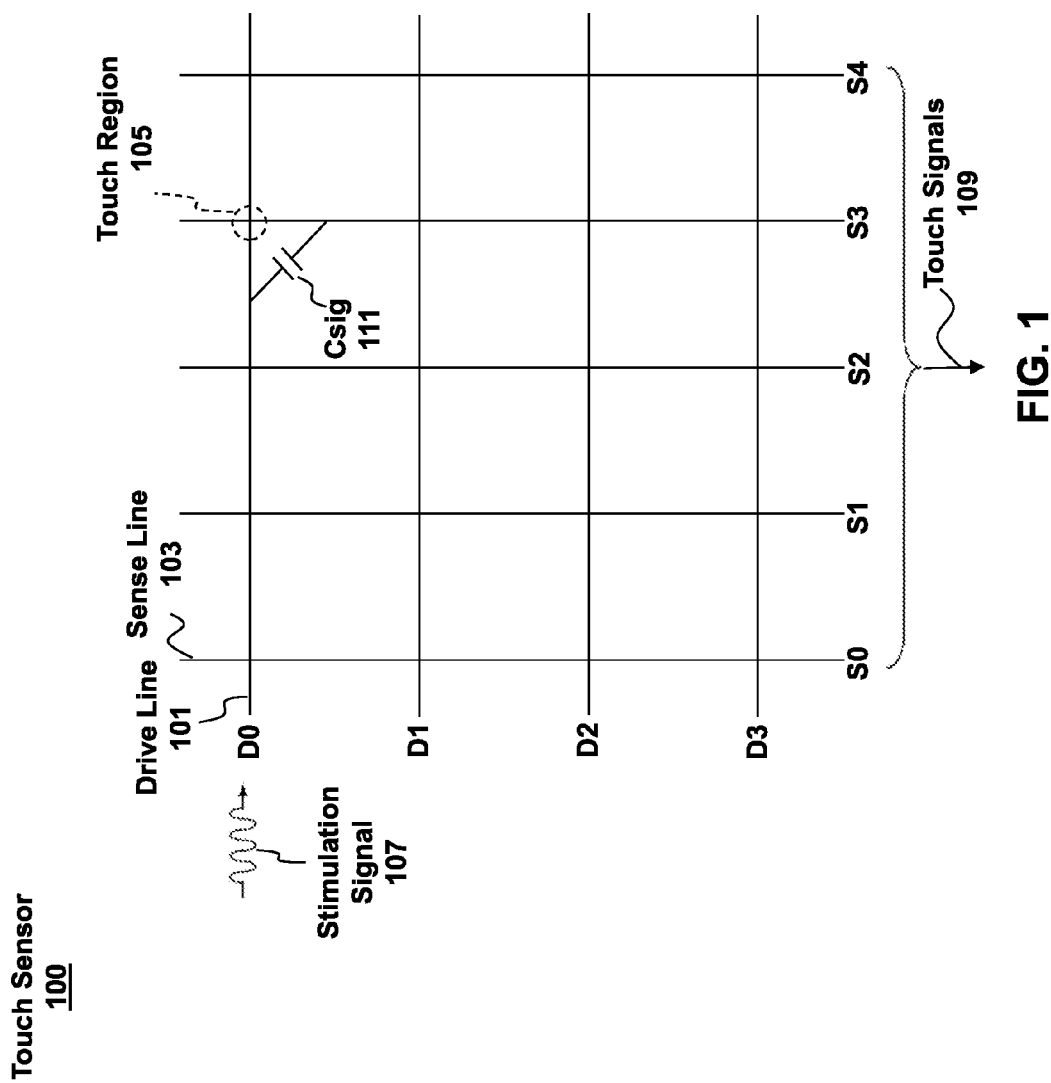
FIG. 1 illustrates an exemplary touch sensor that can be used with a touch sensitive device according to various examples.

FIG. 1 illustrates touch sensor 100 that can be used to detect touch events on a touch sensitive device, such as a mobile phone, tablet, touchpad, portable or desktop computer, portable media player, or the like. Touch sensor 100 can include an array of touch regions or nodes 105 that can be formed at the crossing points between rows of drive lines 101 (D0-D3) and columns of sense lines 103 (S0-S4), although it should be understood that the row/drive line and column/sense line associations are only exemplary. Each touch region 105 can have an associated mutual capacitance Csig 111 formed between the crossing drive lines 101 and sense lines 103 when the drive lines are stimulated. The drive lines 101 can be stimulated by stimulation signals 107 provided by drive circuitry (not shown) and can include an alternating current (AC) waveform. The sense lines 103 can transmit touch signals 109 indicative of a touch at the touch sensor 100 to sense circuitry (not shown), which can include a sense amplifier for each sense line, or a fewer number of sense amplifiers that can be multiplexed to connect to a larger number of sense lines.

To sense a touch at the touch sensor 100, drive lines 101 can be stimulated by the stimulation signals 107 to capacitively couple with the crossing sense lines 103, thereby forming a capacitive path for coupling charge from the drive lines 101 to the sense lines 103. The crossing sense lines 103 can output touch signals 109, representing the coupled charge or current. When an object, such as a passive stylus, finger, etc., touches the touch sensor 100, the object can cause the capacitance Csig 111 to reduce by an amount ΔCsig at the touch location. This capacitance change ΔCsig can be caused by charge or current from the stimulated drive line 101 being shunted through the touching object to ground rather than being coupled to the crossing sense line 103 at the touch location. The touch signals 109 representative of the capacitance change ΔCsig can be received by the sense lines 103 and transmitted to the sense circuitry for processing. The touch signals 109 can indicate the touch region where the touch occurred and the amount of touch that occurred at that touch region location.

While the example shown in FIG. 1 includes four drive lines 101 and five sense lines 103, it should be appreciated that touch sensor 100 can include any number of drive lines 101 and any number of sense lines 103 to form the desired number and pattern of touch regions 105. Additionally, while the drive lines 101 and sense lines 103 are shown in FIG. 1 in a crossing configuration, it should be appreciated that other configurations are also possible to form the desired touch region pattern. While FIG. 1 illustrates mutual capacitance touch sensing, other touch sensing technologies may also be used in conjunction with examples of the disclosure, such as self-capacitance touch sensing, resistive touch sensing, projection scan touch sensing, and the like. Furthermore, while various examples describe a sensed touch, it should be appreciated that the touch sensor 100 can also sense a hovering object and generate hover signals therefrom.

In some examples, the stimulation signals 107 used to stimulate each drive line D0-D3 can have the same frequency. However, each stimulation signal 107 can have a different phase offset that allows the sense circuitry to uniquely identify the stimulation signal 107 from each drive line. In this way, the sense circuitry can detect a touch or hover event at any touch region 105 using a single touch signal 109 for each sense line 103. While this technique can be used to effectively detect touch or hover events on smaller touch sensitive devices, the time required to scan the touch sensor for the touch or hover events can become undesirably long on larger devices.

Figure 2:
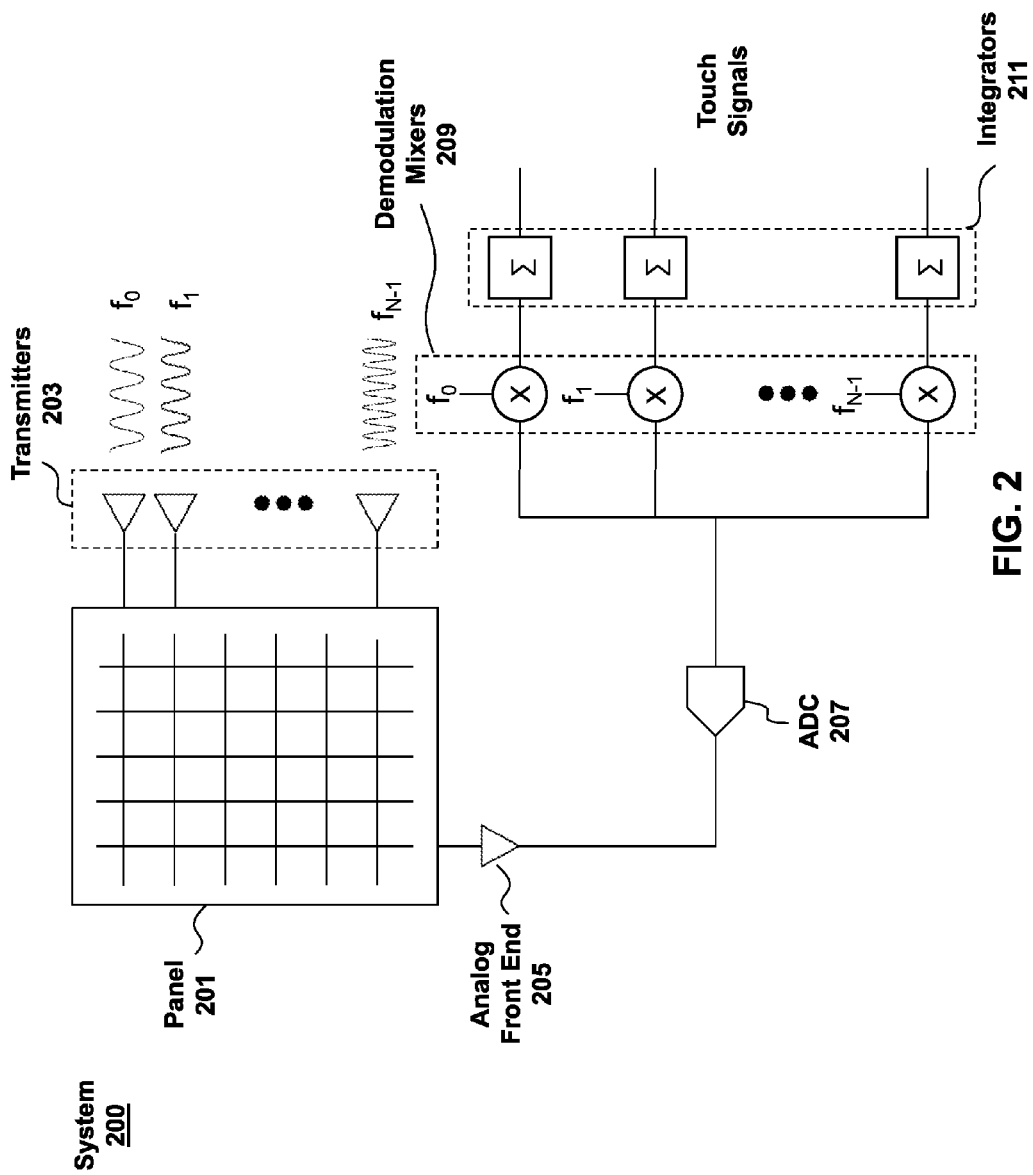
FIG. 2 illustrates a block diagram of an exemplary system for stimulating a touch sensor using orthogonal frequencies according to various examples.

To reduce the time required to scan for the touch or hover events and to reduce noise in touch signals 109, an orthogonal frequency scan scheme can be used. FIG. 2 illustrates a block diagram of an exemplary system 200 for stimulating a touch sensor using orthogonal frequencies according to various examples.

System 200 can include a touch sensor panel 201 similar or identical to touch sensor 100. Touch sensor panel 201 can include any number of drive lines or electrodes and sense lines or electrodes arranged in any desired configuration. System 200 can further include drive circuitry (including transmitters 203) for generating orthogonal stimulation signals having frequencies $f_0$-$f_{N-1}$ for each of the N drive lines of panel 201. The orthogonal frequencies can be frequencies selected to reduce or minimize the interference between stimulation signals. In some examples, the spacing, or difference, between the orthogonal frequencies can be selected to be inversely proportional to the total touch integration time. For example, if the total integration time is 2 ms, then the frequency spacing between the orthogonal frequencies can be 500 Hz ($\Delta f=1/(0.002)=500$).

System 200 can further include sense circuitry coupled to receive touch signals from each of the sense lines of panel 201. For each sense line of panel 201, the sense circuitry can include analog front end circuitry 205, which can include a sense amplifier, transimpedance amplifier, or the like, coupled to receive a touch signal from a sense line of panel 201. The sense circuitry can further include an analog-to-digital converter (ADC) 207 coupled to receive the output of analog front end circuitry 205. The digital output of ADC 207 can be coupled to a set of demodulation mixers 209, which can also be included within the sense circuitry, corresponding to each of the stimulation signal frequencies $f_0$-$f_{N-1}$ for the drive lines of panel 201. The demodulation mixers 209 can be configured to demodulate the digital output of ADC 207 by multiplying the digital output by each of the frequencies $f_0$-$f_{N-1}$. The sense circuitry can further include a set of integrators 211 coupled to receive the demodulated signals from demodulation mixers 209 and configured to integrate the received demodulated signals over an integration time. As mentioned above, the integration time for integrators 211 can be inversely proportional to the frequency spacing between the orthogonal frequencies $f_0$-$f_{N-1}$. The output of integrators 211 can be used to identify touch or hover events at each touch region along a particular sense line. For example, the output of the first (e.g., top) integrator can be representative of detected touch or hover events (or lack thereof) at the touch region corresponding to the intersection of the first drive line (stimulated with frequency $f_0$) and the sense line coupled to analog front end circuitry 205.

While not shown, it should be appreciated that similar analog front end circuitry, ADCs, sets of demodulation mixers, and sets of integrators can be included within system 200 for each sense line of panel 201. These additional circuits can be used to generate signals representative of detected touch or hover events at tough regions along each of the other sense lines of panel 201 in a similar manner as described above.

Figure 3:
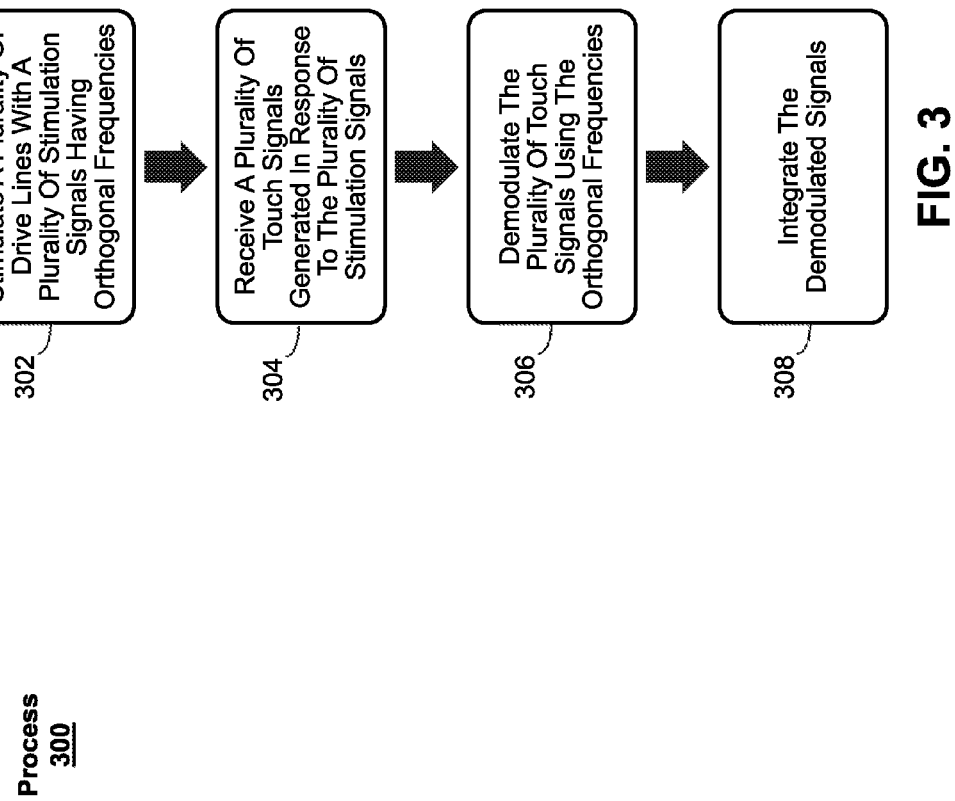
FIG. 3 illustrates an exemplary process for stimulating a touch sensor using orthogonal frequencies according to various examples.

FIG. 3 illustrates an example process 300 for stimulating a touch sensor using orthogonal frequencies according to various examples. Process 300 can be performed by a system similar or identical to that shown in FIG. 2. At block 302, the drive lines of a touch sensor panel, such as touch sensor panel 201, can be driven with stimulation signals, such as stimulation signals 107, having orthogonal frequencies. In some examples, each drive line can be stimulated with a stimulation signal having a different orthogonal frequency. As mentioned above, the spacing, or difference, between the orthogonal frequencies can be selected to be inversely proportional to the total touch integration time. Drive circuitry having transmitters similar or identical to transmitters 203 can be used to generate the orthogonal frequency stimulation signals.

Figure 4:
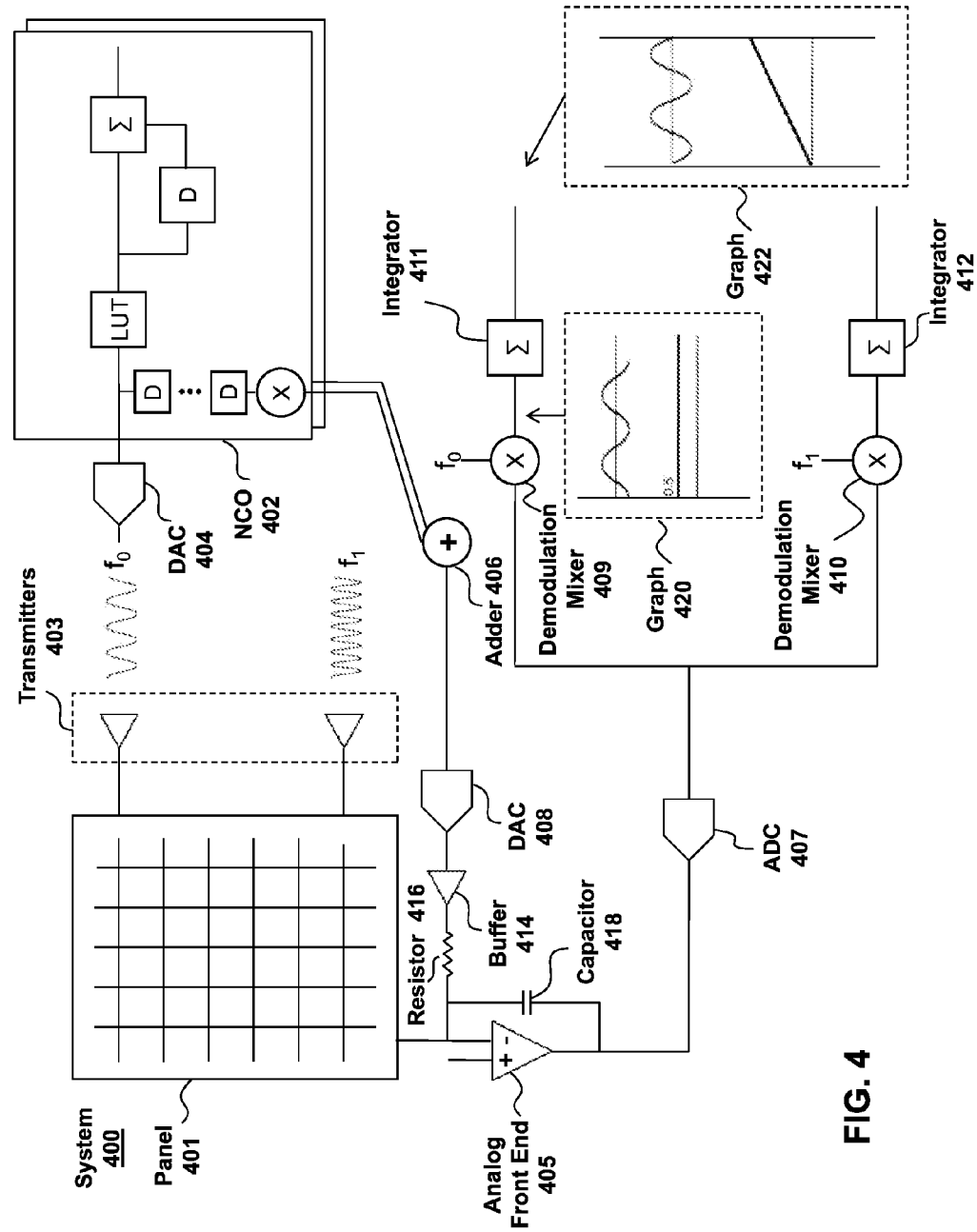
FIG. 4 illustrates a block diagram of an exemplary system for stimulating a touch sensor using orthogonal frequencies according to various examples.

To illustrate, FIG. 4 shows a block diagram of an exemplary system 400 that can be used to stimulate a touch sensor using process 300. System 400 is similar to system 200, except that system 400 includes circuitry for offset cancelation and panel 401 includes only two drive lines coupled to receive first and second stimulation signals having orthogonal frequencies $f_0$ and $f_1$. The stimulation signals can be generated using drive circuitry that can include numerically controlled oscillator (NCO) 402, digital to analog converter (DAC) 404, and transmitters 403. In the illustrated example, NCO 402 can include an integrator coupled to receive frequency words for frequency $f_0$ and a delayed output of the integrator. A sin lookup table (LUT) can be coupled to receive the output of the integrator and can be configured to output a digital sinusoidal signal having a desired frequency (e.g., frequency $f_0$). The output of the LUT can be coupled to DAC 404, which can be configured to convert the digital output of the LUT into an analog signal having frequency $f_0$. The analog output of DAC 404 can be provided to one of transmitters 403 to be provided to a drive line of panel 401. In some examples, the total touch integration time can be 2 ms and the spacing, or difference, between the orthogonal frequencies $f_0$ and $f_1$ can be 500 Hz ($\Delta f=1/(0.002)=500$). For example, if $f_0$ is 300 kHz, then $f_1$ can be 300.5 kHz.

It should be appreciated that the drive circuitry shown in FIG. 4 is provided as an example, and that other drive circuitry capable of generating stimulation signals having orthogonal frequencies can be used. Additionally, while not shown, it should be appreciated that the drive circuitry can include additional NCOs and DACs for each of the drive lines of panel 401.

Referring back to FIG. 3, at block 304, a plurality of touch signals that were generated in response to the plurality of stimulation signals used to stimulate the plurality of drive lines at block 302 can be received. The touch signals can be similar or identical to touch signals 109 discussed above. Since the stimulation signals provided to each drive line of the touch sensor panel can have a different frequency, the touch signals can have a number of components corresponding to the number of drive lines in the touch sensor panel, with each component having a frequency corresponding to one of the orthogonal frequencies of the stimulation signals. The touch signals can be received by sense circuitry that includes analog front end circuitry for amplifying the received touch signals. The analog front end circuitry can be similar or identical to analog front end circuitry 205 and can include an amplifier, transimpedance amplifier, or the like. The amplified touch signals can be converted into a digital signal using an ADC similar or identical to ADC 207.

To illustrate, continuing with the example shown in FIG. 4, a plurality of touch signals corresponding to each of the sense lines of touch sensor panel 401 and generated in response to the stimulation signals provided to the drive lines of panel 401 from transmitters 403 can be received and amplified by analog front end circuitry that can be similar or identical to analog front end circuitry 205. FIG. 4 illustrates one analog front end circuitry 405 for receiving one touch signal from a sense line of panel 401. The amplified touch signal can then be converted into a digital signal using ADC 407, which can be similar or identical to ADC 207. Since touch sensor panel 401 includes two drive lines in this example, the touch signal received by analog front end circuitry 405 can include a first component having a frequency $f_0$ and a second component having a frequency of $f_1$. In the illustrated example, system 400 includes offset cancelation circuitry to improve the sensing of the touch signals by the sense circuitry by reducing an offset swing at a sense amplifier included within analog front end circuitry 405. In particular, NCO 402 can include delay circuitry coupled to receive the digital output of the LUT and a multiplier coupled to receive the output of the delay circuitry. The output of the multiplier of each NCO can be coupled to an adder 406. The output of adder 406 can be coupled to DAC 408, buffer 414, resistor 416, capacitor 418, and the negative input of a sense amplifier included within analog front end circuitry 405. The positive terminal of the sense amplifier included within analog front end circuitry 405 can be coupled to a bias voltage having a value that can be selected based on the voltages within system 400. In operation, NCO 402 can be used to generate the stimulation signal sent to panel 401 and the delay circuitry and multiplier coupled to the output of the LUT can be adjusted to reduce or minimize the output of ADC 407 (or the output voltage of Analog front end 405). The generation of stimulation signals and adjustment of the delay circuitry and multipliers can be performed for the NCOs for each drive line.

While not shown, it should be appreciated that system 400 can include additional front end circuitry and ADCs coupled to receive touch signals from each of the sense lines of panel 401 and coupled to receive the digital sum of the outputs of the NCOs.

Referring back to FIG. 3, at block 306, the (amplified and digitally converted) plurality of touch signals received at block 306 can be demodulated using the orthogonal frequencies of the plurality of stimulation signals used to stimulate the drive lines of the touch sensor panel at block 302. In some examples, this can include multiplying the received touch signals by sinusoidal signals having frequencies corresponding to each of the orthogonal frequencies of the stimulation signals. Demodulation mixers similar or identical to demodulation mixers 209 can be used. As a result of the demodulation, a signal having a direct current (DC) component attributable to the stimulation signal having the frequency corresponding to the demodulation frequency (e.g., the frequency of the sinusoidal signal multiplied with the amplified and digitally converted touch signal) and an AC component (e.g., noise) having a frequency equal to the spacing between the orthogonal frequencies of the stimulation signals can be generated.

To illustrate, continuing with the example shown in FIG. 4, the amplified and digitally converted touch signal output by ADC 407 can be multiplied by a sinusoidal signal having a frequency $f_0$ using demodulation mixer 409, which can be similar or identical to demodulation mixers 209. As shown in graph 420, the output of demodulation mixer 409 can include a DC component attributable to the stimulation signal having frequency $f_0$ and an AC component (e.g., noise due to the stimulation signal having frequency $f_1$) having a frequency equal to the spacing between the orthogonal frequencies of the stimulation signals (e.g., 500 Hz if a total integration time of 2 ms is used). The amplified and digitally converted touch signal output by ADC 407 can also be multiplied by a sinusoidal signal having a frequency $f_1$ using demodulation mixer 410, which can be similar or identical to demodulation mixers 209. The output of demodulation mixer 410 can similarly include a DC component attributable to the stimulation signal having frequency $f_1$ and an AC component (e.g., noise due to the stimulation signal having frequency $f_0$) having a frequency equal to the spacing between the orthogonal frequencies of the stimulation signals (e.g., 500 Hz if a total integration time of 2 ms is used).

While not shown, it should be appreciated that system 400 can include additional demodulation mixers coupled to receive the outputs of additional ADCs for each of the sense lines of panel 401.

Referring back to FIG. 3, at block 308, the plurality of demodulated signals can be integrated over a touch integration time. In some examples, an integrator similar or identical to integrators 211 can be used. Additionally, as mentioned above, the integration time can be inversely proportional to the frequency spacing between the orthogonal frequencies of the stimulation signals. As mentioned above, the demodulated signal generated at block 306 can include a DC component attributable to the stimulation signal having a frequency corresponding to the demodulation frequency (e.g., the frequency of the sinusoidal signal multiplied with the amplified and digitally converted touch signal) and an AC component (e.g., noise) having a frequency equal to the spacing between the orthogonal frequencies of the stimulation signals. Since the touch integration time is inversely proportional to the frequency spacing between the orthogonal frequencies of the stimulation signals, the AC component of the demodulated signal can be integrated over a length of time corresponding to a positive integer multiple of a period of the AC component, resulting in an integrated value of zero. The integration of the DC component of the demodulation signal, however, can linearly increase over the touch integration time. As a result, the integrated signal can include only the portion of the touch signal attributable to the stimulation signal having the frequency corresponding to the demodulation frequency. This resulting integrated signal can be processed to detect touch or hover events at locations corresponding to the intersections between the drive lines and sense lines of the panel.

To illustrate, continuing with the example shown in FIG. 4, the demodulated touch signals output by demodulation mixers 409 and 410 can be provided to integrators 411 and 412, respectively. Integrators 411 and 412 can be configured to integrate the modulated signals over a length of time that is inversely proportional to the frequency spacing between the orthogonal frequencies $f_0$ and $f_1$. As shown in graph 420, the signal between demodulation mixer 409 and integrator 411 can include an AC component having a frequency equal to the spacing between the orthogonal frequencies (e.g., 500 Hz) and a DC component attributable to the stimulation signal having the frequency corresponding to the demodulation frequency (e.g., $f_0$). Graph 422 shows the AC and DC components integrated over the touch integration time. As shown, integration of the AC component (e.g., noise) results in a net value of zero at the end of the touch integration time, while the integration of the DC component increases linearly over the touch integration time. Thus, the output of integrator 411 can include only the portion of the touch signal attributable to the stimulation signal having the frequency corresponding to the demodulation frequency (frequency $f_0$). This resulting integrated signal can be processed to detect touch or hover events at the touch region corresponding to the intersection between the drive line stimulated with frequency $f_0$ and the sense line coupled to analog front end circuitry 405. Integrator 412 can similarly integrate the demodulated signal output by demodulation mixer 410 to produce a signal including only the portion of the touch signal attributable to the stimulation signal having the frequency corresponding to the demodulation frequency (frequency $f_1$). This resulting integrated signal can be processed to detect touch or hover events at the touch region corresponding to the intersection between the drive line stimulated with frequency $f_1$ and the sense line coupled to analog front end circuitry 405.

While not shown, it should be appreciated that system 400 can include additional integrators coupled to receive the outputs of additional demodulation mixers for each of the sense lines of panel 401.

Figure 5:
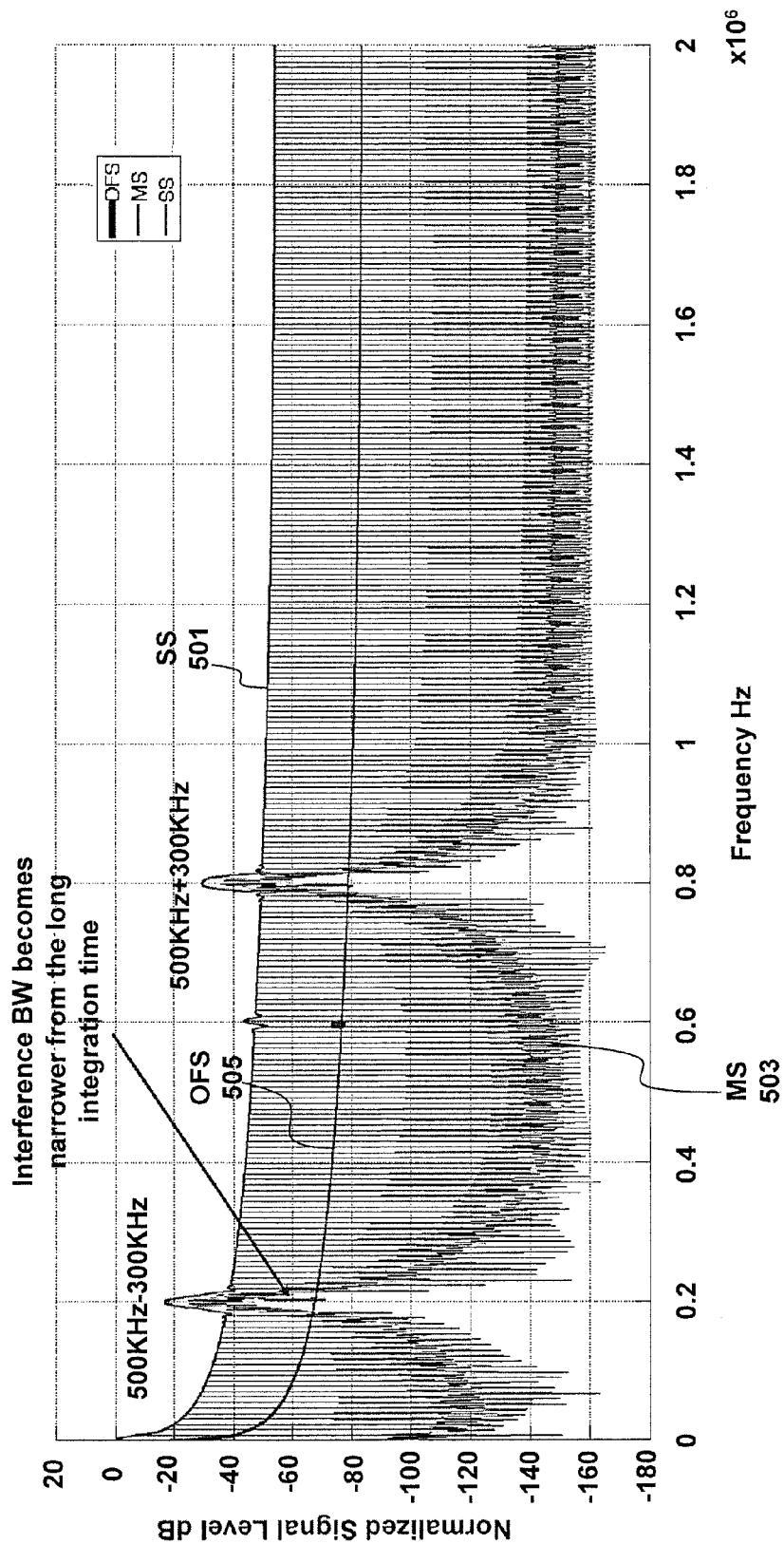
FIG. 5 depicts a graph showing example frequency spectrums of signals generated using various touch stimulation techniques.

FIG. 5 depicts a graph 500 showing example frequency spectrums of signals generated using various touch stimulation techniques. In particular, line 501 represents the integrated output of a touch signal using a single-stim (SS) technique in which only one drive line is stimulated at a time. Line 503 represents the integrated output of a touch signal using a multi-stim (MS) technique in which multiple drive lines are stimulated at the same time using stimulation signals with the same frequency. Line 505 represents the integrated output of a touch signal using an orthogonal frequency scan (OFS) technique as described herein. As shown by graph 500, the interference bandwidth of the OFS 505 line is narrower than those of the SS 501 and MS 503 lines. As a result, the integrated signals generated using an orthogonal frequency scan technique can experience less interference than those generated using other scanning techniques.

Figure 6:
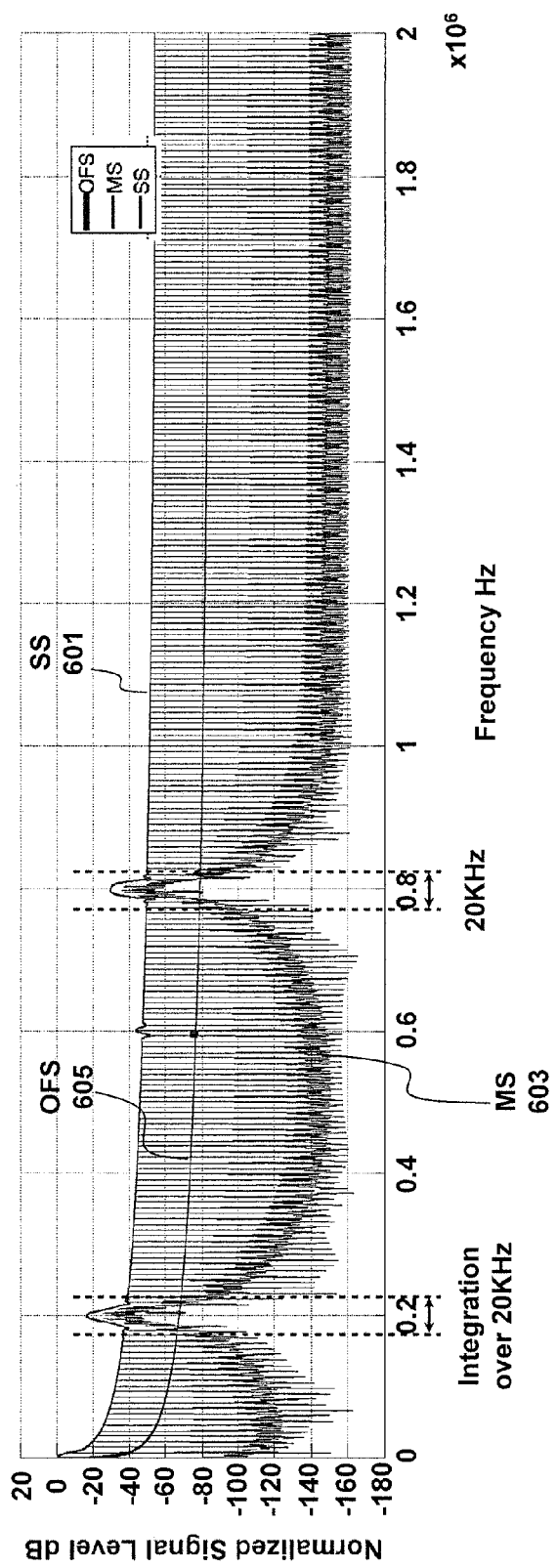
FIG. 6 depicts a graph showing normalized signal level strengths over interference bandwidths for various touch stimulation techniques.

To illustrate, FIG. 6 depicts a graph 600 showing normalized signal level strengths over interference bandwidths for various touch stimulation techniques. In particular, line 601 represents the integrated output of a touch signal using a SS technique in which only one drive line is stimulated at a time. Line 603 represents the integrated output of a touch signal using a MS technique in which multiple drive lines are stimulated at the same time using stimulation signals with the same frequency. Line 605 represents the integrated output of a touch signal using an OFS technique as described herein. As shown by graph 600, the normalized strength of interference using the MS scanning technique is approximately −14.5 dB less than that generated using the SS scanning technique. Additionally, the normalized strength of interference using the OFS technique is approximately −42 dB less than that generated using the SS scanning technique.

Figure 7:
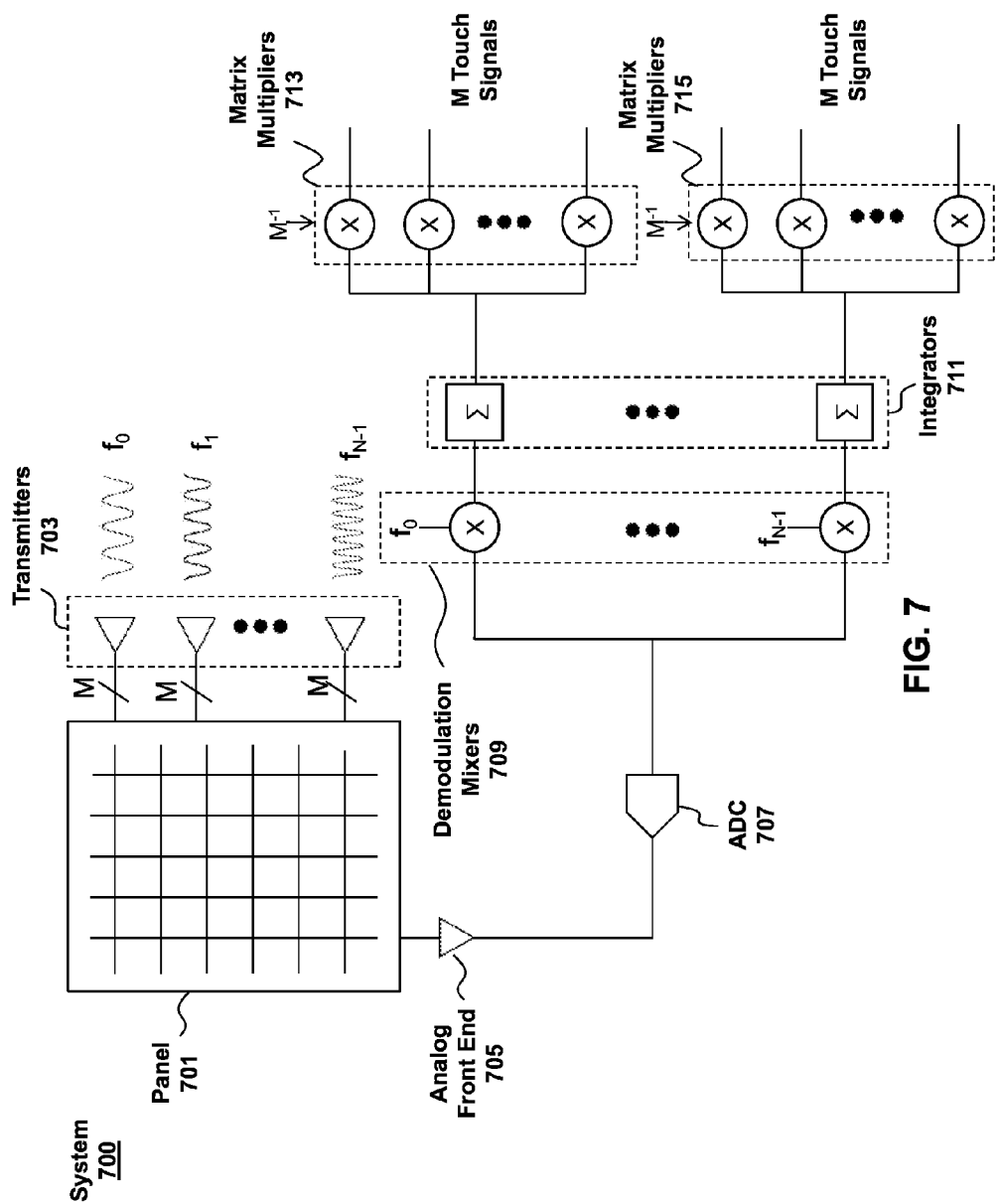
FIG. 7 illustrates a block diagram of an exemplary system for stimulating a touch sensor using orthogonal frequencies and phase offsets according to various examples.

FIG. 7 illustrates a block diagram of another exemplary system 700 for stimulating a touch sensor using a combination of orthogonal frequencies and phase offsets according to various examples. System 700 can operate in a manner similar to that of system 200, except that each drive line may not be stimulated with a stimulation signal having a different frequency. Instead, the drive lines can be grouped into sets of drive lines, where each set of drive lines can be driven with a stimulation signal having an orthogonal frequency. Within each set of drive lines, the drive lines can each be driven with a stimulation signal having the same frequency, but with a different phase offset. In this way, each drive line can be driven with a stimulation signal having a unique combination of frequency and phase.

System 700 can include a touch sensor panel 701 similar or identical to touch sensor 100, 201, or 401. Touch sensor panel 701 can include any number of drive lines and sense lines arranged in any desired configuration. The drive lines of touch sensor panel 701 can be divided into N sets, with each set having one or more drive lines. In the illustrated example, the N sets of drive lines each include M drive lines. However, it should be appreciated that each set of drive lines can include the same or a different number of drive lines.

System 700 can further include drive circuitry (including transmitters 703) for generating orthogonal stimulation signals having frequencies $f_0$-$f_{N-1}$ for each of the N sets of drive lines of panel 701. The orthogonal frequencies can be frequencies selected to reduce or minimize the interference between stimulation signals. In some examples, the spacing, or difference, between the orthogonal frequencies can be selected to be inversely proportional to the total touch integration time. For example, if the total integration time is 2 ms, then the frequency spacing between the orthogonal frequencies can be 500 Hz ($\Delta f=1/(0.002)=500$). Within each of the N sets of drive lines, the stimulation signals can be configured to have different phase offsets to allow the sense circuitry to differentiate between stimulation signals within the same set and having the same frequency. For example, the drive circuitry can include multipliers configured to multiply stimulation signals within each set by a matrix (e.g., an identity matrix, Hadamard matrix, or circulant matrix) The matrices used for each of the sets of drive lines can be the same or different.

System 700 can further include sense circuitry that includes analog front end circuitry 705, which can include a sense amplifier, transimpedance amplifier, or the like, coupled to each sense line of panel 701. The output of analog front end circuitry 705 can be coupled to ADC 707. The digital output of ADC 707 can be coupled to a set of N demodulation mixers 709 corresponding to each of the stimulation signal frequencies for the drive lines of panel 701. The demodulation mixers 709 can be configured to demodulate the digital output of ADC 707 by multiplying the digital signal by each of the frequencies $f_0$-$f_{N-1}$. The demodulated signals from demodulation mixers 709 can be coupled to a set of N integrators 711 configured to integrate the received signal over an integration time. As mentioned above, the integration time for integrators 711 can be inversely proportional to the frequency spacing between the orthogonal frequencies $f_0$-$f_{N-1}$. The output of each of the integrators 711 can be provided to a set of M matrix multipliers (e.g., matrix multipliers 713 and 715). These multipliers can multiply the integrated touch signals by the inverse of the matrix used to generate the phase offsets for the particular set of drive lines (e.g., the matrix used to determine the phase offsets for the set of drive lines). The output of the matrix multipliers (e.g., matrix multipliers 713 and 715) can be used to identify touch or hover events at each touch region along a particular sense line. For example, the output of the first (e.g., top) matrix multiplier can be representative of detected touch or hover events (or lack thereof) at the touch region corresponding to the intersection of the first drive line (stimulated with frequency $f_0$ and first phase offset) and the sense line coupled to analog front end circuitry 705.

Using a combination of orthogonal frequencies and phase offsets to differentiate between the drive lines allows system 700 to include fewer transmitters (e.g., transmitters 703), DACs, and demodulators (e.g., demodulation mixers 709) than a system similar to system 200 having a touch panel of equal size.

It should be appreciated that FIG. 7 only illustrates the analog front end circuitry 705, ADC 707, demodulation mixers 709, integrators 711, and matrix multipliers 713 and 715 for one sense line of panel 701. While not shown, similar analog front end circuitry, ADCs, sets of demodulation mixers, sets of integrators, and sets of matrix multipliers can be included within system 700 for each sense line of panel 701. Additionally, offset cancelation circuitry similar to that shown in FIG. 4 can also be included in system 700.

Figure 8:
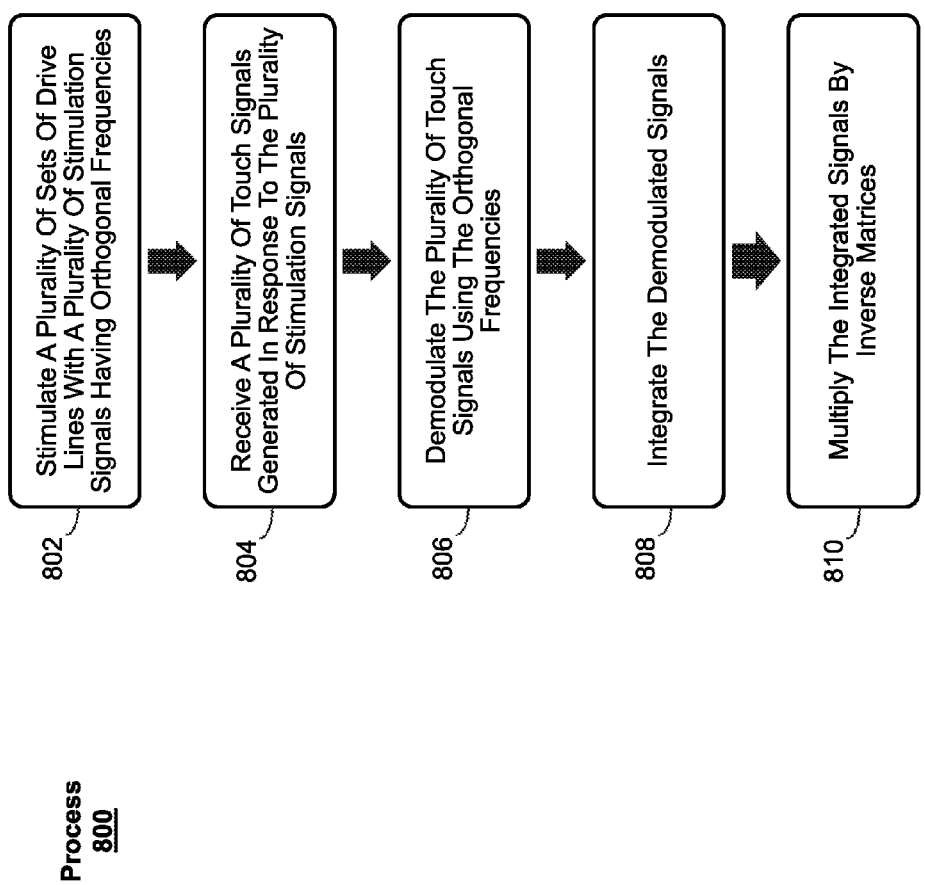
FIG. 8 illustrates an exemplary process for stimulating a touch sensor using orthogonal frequencies and phase offsets according to various examples.

FIG. 8 illustrates an example process 800 for stimulating a touch sensor using stimulation signals with orthogonal frequencies and different phases according to various examples. Process 800 can be performed by a system similar or identical to that shown in FIG. 7. At block 802, sets of one or more drive lines of a touch sensor panel, such as touch sensor panel 701, can be driven with stimulation signals, such as stimulation signals 107, having orthogonal frequencies. As mentioned above, the spacing, or difference, between the orthogonal frequencies can be selected to be inversely proportional to the total touch integration time of the touch sensor panel. Within each set of drive lines, the drive lines can each be driven with a stimulation signal having the same frequency, but with a different phase offset. The orthogonal frequency stimulation signals having various phase offsets can be generated using drive circuitry that can include transmitters similar or identical to transmitters 703 and multipliers configured to multiply the stimulation signals within each set of drive lines by a matrix (e.g., an identity matrix, Hadamard matrix, or circulant matrix). The matrices used for each of the sets of drive lines can be the same or different.

Figure 9:
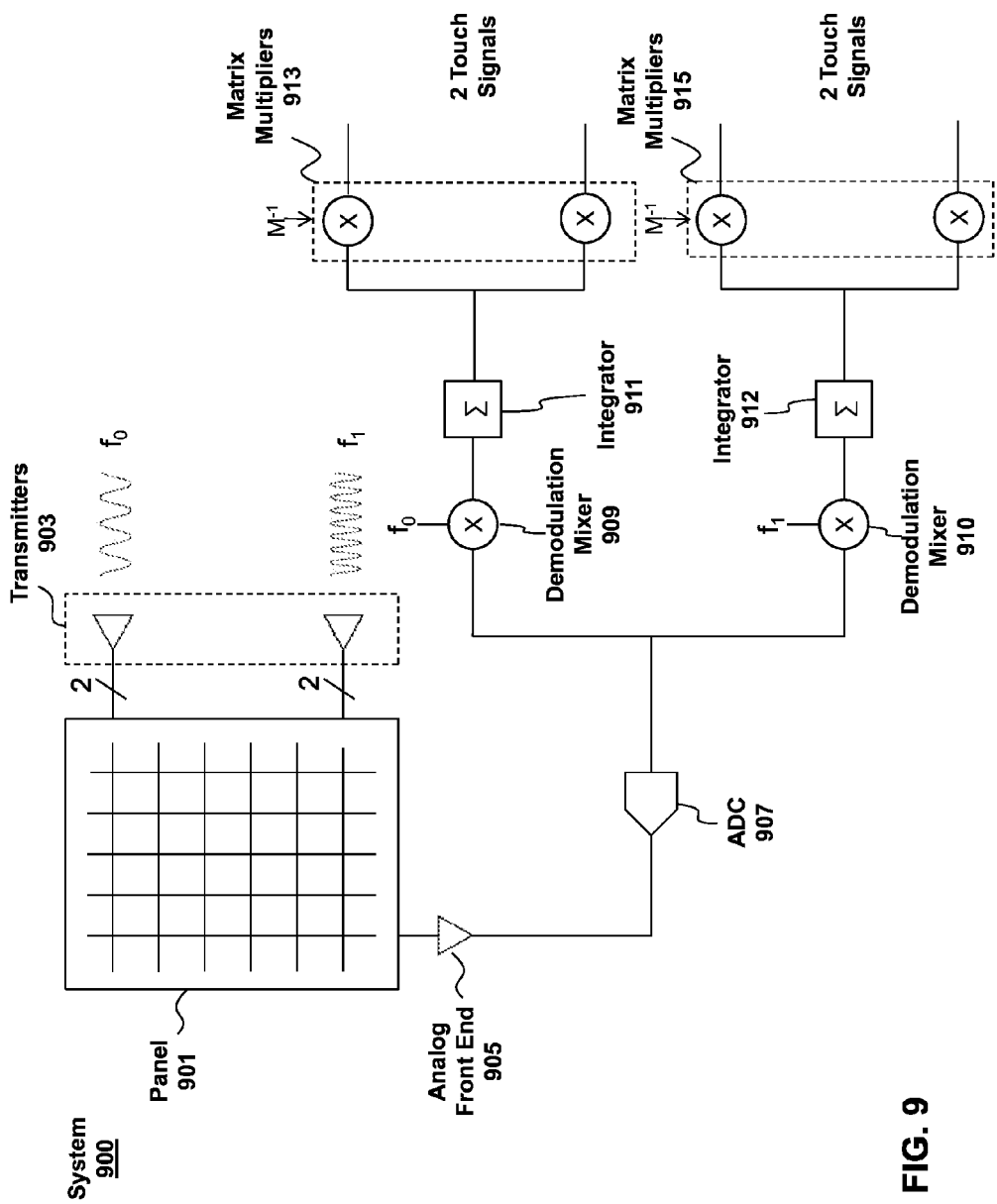
FIG. 9 illustrates a block diagram of an exemplary system for stimulating a touch sensor using orthogonal frequencies and phase offsets according to various examples.

To illustrate, FIG. 9 shows a block diagram of an exemplary system 900 that can be used to stimulate a touch sensor using process 800. System 900 is similar to system 700, except that panel 901 includes only two sets of two drive lines (four drive lines) coupled to receive sets of first and second stimulation signals having orthogonal frequencies $f_0$ and $f_1$. Stimulation signals within each set of stimulation signals can have a different phase offset. For instance, a first drive line can be stimulated with a stimulation signal having a frequency of $f_0$ and a phase offset of $\Phi_0$, a second drive line can be stimulated with a stimulation signal having a frequency of $f_0$ and a phase offset of $\Phi_1$, a third drive line can be stimulated with a stimulation signal having a frequency of $f_1$ and a phase offset of $\Phi_3$, and a fourth drive line can be stimulated with a stimulation signal having a frequency of $f_1$ and a phase offset of $\Phi_4$. The different phase offsets $\Phi_0$, $\Phi_1$, $\Phi_2$, and $\Phi_3$ can have any desired values as long $\Phi_0$ is different than $\Phi_1$ and $\Phi_2$ is different than $\Phi_3$. The stimulation signals can be generated using drive circuitry that includes transmitters 903. In this example, the total touch integration time can be 2 ms and the spacing, or difference, between the orthogonal frequencies $f_0$ and $f_1$ can be 500 Hz ($\Delta f=1/(0.002)=500$). For example, if $f_0$ is 300 kHz, then $f_1$ can be 300.5 kHz.

Referring back to FIG. 8, at block 804, a plurality of touch signals that were generated in response to the plurality of stimulation signals used to stimulate the plurality of drive lines at block 802 can be received. The touch signals can be similar or identical to touch signals 109 discussed above. Since the stimulation signals provided to each drive line of the touch sensor panel can have a different combination of frequency and phase, the touch signals can have a number of components corresponding to the number of drive lines in the touch sensor panel, with each component having a different combination of frequency and phase. The touch signals can be received by sense circuitry that includes analog front end circuitry for amplifying the received touch signals. The analog front end circuitry can be similar or identical to analog front end circuitry 205 and can include an amplifier, transimpedance amplifier, or the like. The amplified touch signals can be converted into digital signals using ADCs similar or identical to ADC 207.

To illustrate, continuing with the example shown in FIG. 9, a plurality of touch signals corresponding to each of the sense lines of touch sensor panel 901 and generated in response to the stimulation signals provided to the drive lines of panel 901 from transmitters 903 can be received and amplified by analog front end circuitry that can be similar or identical to analog front end circuitry 205. FIG. 9 illustrates one analog front end circuitry 905 for receiving one touch signal from a sense line of panel 901. Since touch sensor panel 901 includes four drive lines in this example, the touch signal received by analog front end circuitry 405 can include a first component having a frequency of $f_0$ and a phase offset of $\Phi_0$, a second component having a frequency of $f_0$ and a phase offset of $\Phi_1$, a third component having a frequency of $f_1$ and a phase offset of $\Phi_3$, and a fourth component having a frequency of $f_1$ and a phase offset of $\Phi_4$. The amplified touch signal can then be converted into a digital signal using ADC 907, which can be similar or identical to ADC 207.

While not shown, it should be appreciated that system 900 can include additional front end circuitry and ADCs coupled to receive touch signals from each of the sense lines of panel 901.

Referring back to FIG. 8, at block 806, the (amplified and digitally converted) plurality of touch signals received at block 806 can be demodulated using the orthogonal frequencies of the plurality of stimulation signals used to stimulate the drive lines of the touch sensor panel at block 802. In some examples, this can include multiplying the received touch signals by sinusoidal signals having frequencies corresponding to each of the orthogonal frequencies of the stimulation signals. Demodulation mixers similar or identical to demodulation mixers 209 can be used. As a result of the demodulation, a signal having a DC component attributable to the stimulation signal having the frequency corresponding to the demodulation frequency (e.g., the frequency of the sinusoidal signal multiplied with the amplified and digitally converted touch signal) and an AC component (e.g., noise) having a frequency equal to the spacing between the orthogonal frequencies of the stimulation signals can be generated.

To illustrate, continuing with the example shown in FIG. 9, the amplified and digitally converted plurality of touch signals output by ADC 907 can be multiplied by a sinusoidal signal having a frequency $f_0$ using demodulation mixer 909, which can be similar or identical to demodulation mixers 209. The amplified and digitally converted touch signal can also be multiplied by a sinusoidal signal having a frequency $f_1$ using demodulation mixer 910, which can be similar or identical to demodulation mixers 209.

While not shown, it should be appreciated that system 900 can include additional demodulation mixers coupled to receive the outputs of additional ADCs for each of the sense lines of panel 901.

Referring back to FIG. 8, at block 808, the plurality of demodulated signals can be integrated over a touch integration time. In some examples, an integrator similar or identical to integrators 211 can be used. Additionally, the integration time can be inversely proportional to the frequency spacing between the orthogonal frequencies of the stimulation signals. As mentioned above, the demodulated signal generated at block 806 can include a DC component attributable to the stimulation signal having the frequency corresponding to the demodulation frequency (e.g., the frequency of the sinusoidal signal multiplied with the amplified and digitally converted touch signal) and an AC component (e.g., noise) having a frequency equal to the spacing between the orthogonal frequencies of the stimulation signals. Since the touch integration time is inversely proportional to the frequency spacing between the orthogonal frequencies of the stimulation signals, the AC component of the demodulated signal can be integrated over a length of time corresponding to a period of the AC component, resulting in an integrated value of zero. The integration of the DC component of the demodulation signal, however, can linearly increase over the touch integration time. As a result, the integrated signal can include only the portion of the touch signal attributable to the stimulation signal having the frequency corresponding to the demodulation frequency.

To illustrate, continuing with the example shown in FIG. 9, the demodulated touch signals output by demodulation mixers 909 and 910 can be provided to integrators 911 and 912, respectively. Integrators 911 and 912 can be configured to integrate the modulated signals over a length of time that is inversely proportional to the frequency spacing between the orthogonal frequencies $f_0$ and $f_1$. Since the touch integration time is inversely proportional to the frequency spacing between the orthogonal frequencies of the stimulation signals, the AC component of the demodulated signal can be integrated over a length of time corresponding to a positive integer multiple of a period of the AC component, resulting in an integrated value of zero. The integration of the DC component of the demodulation signal, however, can linearly increase over the touch integration time. As a result, the integrated signal can include only the portion of the touch signal attributable to the stimulation signal having the frequency corresponding to the demodulation frequency.

While not shown, it should be appreciated that system 900 can include additional integrators coupled to receive the outputs of additional demodulation mixers for each of the sense lines of panel 901.

Referring back to FIG. 8, at block 810, the integrated signals can be multiplied by the inverse of the matrices used to generate the stimulation signals. Multipliers similar or identical to matrix multipliers 713 and 715 can be used to multiple the integrated touch signals by the inverse of the matrix used to generate the phase offsets for the particular set of drive lines (e.g., the matrix used to determine the phase offsets for the set of drive lines). The resulting signals can be used to identify touch or hover events at each touch region along a particular sense line.

To illustrate, continuing with the example shown in FIG. 9, the integrated signals generated by integrators 911 and 912 can be received by sets of matrix multipliers 913 and 915. In this example, since each set of drive lines included two drive lines, each set of matrix multipliers 913 and 915 can similar include two matrix multipliers. Matrix multipliers 913 can be configured to multiply the integrated output of integrator 911 by the inverse of the matrix used to generate the phase offsets for the stimulation signals having frequency $f_0$, while matrix multipliers 915 can be configured to multiply the integrated output of integrator 912 by the inverse of the matrix used to generate the phase offsets for the stimulation signals having frequency $f_1$. The output of the matrix multipliers (e.g., matrix multipliers 913 and 915) can be used to identify touch or hover events at each touch region along a particular sense line.

While not shown, it should be appreciated that system 900 can include additional matrix multipliers coupled to receive integrated signals from additional integrators for each of the sense lines of panel 901.

One or more of the functions relating to the stimulation of a touch sensor using orthogonal frequencies as described above can be performed by a system similar or identical to system 1000 shown in FIG. 10. System 1000 can include instructions stored in a non-transitory computer readable storage medium, such as memory 1003 or storage device 1001, and executed by processor 1005. The instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The instructions can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

It is to be understood that the system is not limited to the components and configuration of FIG. 10, but can include other or additional components in multiple configurations according to various examples. Additionally, the components of system 1000 can be included within a single device, or can be distributed between multiple devices.

Figure 12:
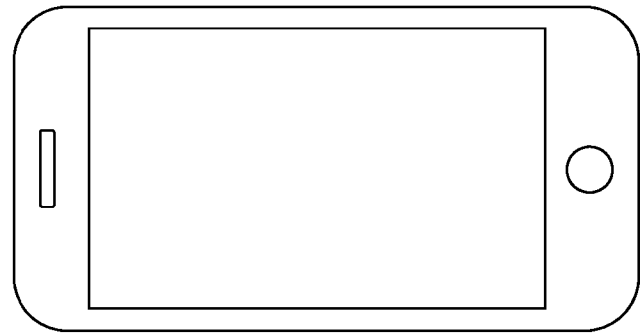
FIGS. 11-14 illustrate exemplary personal devices that can include a touch sensor stimulated using orthogonal frequencies according to various examples.
Figure 11:
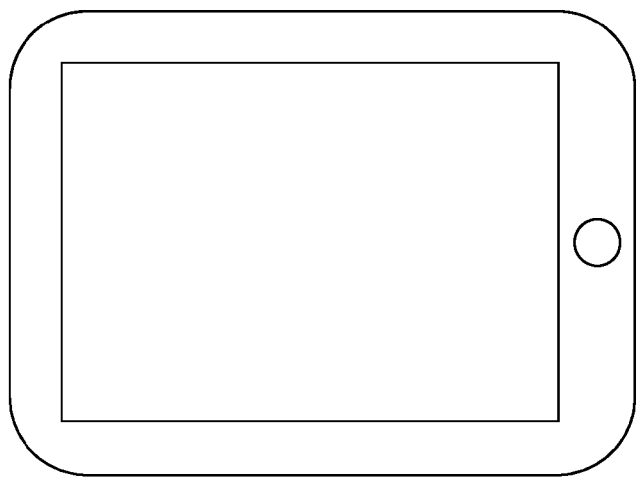
Figure 14:
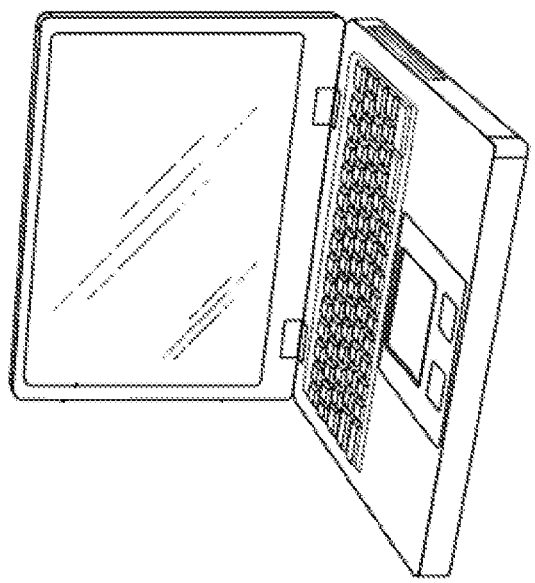
Figure 13:
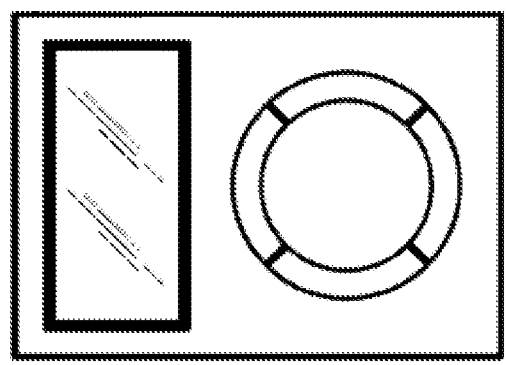

FIGS. 11-14 show example systems in which a touch sensor stimulated using orthogonal frequencies according to examples of the disclosure may be implemented. FIG. 11 illustrates an exemplary personal device 1100, such as a tablet, that can be used with a touch sensor stimulated using orthogonal frequencies according to various examples. FIG. 12 illustrates another exemplary personal device 1200, such as a mobile phone, that can be used with a touch sensor stimulated using orthogonal frequencies according to various examples. FIG. 13 illustrates yet another exemplary personal device 1300, such as a portable media player, that can be used with a touch sensor stimulated using orthogonal frequencies according to various examples. FIG. 14 illustrates another exemplary personal device 1400, such as a laptop computer, that can be used with a touch sensor stimulated using orthogonal frequencies according to various examples.

Therefore, according to the above, some examples of the disclosure are directed to a system comprising: drive circuitry operable to generate a plurality of stimulation signals having a plurality of orthogonal frequencies, the plurality of stimulation signals for driving a plurality of drive electrodes of a touch sensor. Additionally or alternatively to one or more of the examples disclosed above, in some examples, frequencies of the plurality of orthogonal frequencies are separated by a frequency that is inversely proportional to an integration time of the touch sensor. Additionally or alternatively to one or more of the examples disclosed above, in some examples, the system further comprises: the touch sensor, the touch sensor comprising: the plurality of drive electrodes, wherein each of the plurality of drive electrodes is coupled to receive a different stimulation signal of the plurality of stimulation signals from the drive circuitry; and a plurality of sense electrodes capacitively coupled to the plurality of drive electrodes; and sense circuitry coupled to receive a plurality of touch signals from the plurality of sense electrodes and operable to detect a touch or hover event associated with the touch sensor based on the received plurality of touch signals. Additionally or alternatively to one or more of the examples disclosed above, in some examples, the sense circuitry comprises, for each of the plurality of sense electrodes: an amplifier coupled to receive a touch signal of the plurality of touch signals from a sense electrode; an analog to digital converter coupled to receive an output of the amplifier; a plurality of demodulation mixers coupled to receive an output of the analog to digital converter, wherein the plurality of demodulation mixers are operable to demodulate the output of the analog to digital converter by multiplying the output of the analog to digital converter by a plurality of signals having frequencies corresponding to the plurality of orthogonal frequencies; and a plurality of integrators, each integrator coupled to receive a demodulated signal output by one of the plurality of demodulation mixers and operable to integrate the received demodulated signal over an integration time of the touch sensor. Additionally or alternatively to one or more of the examples disclosed above, in some examples, the drive circuitry comprises, for each of the plurality of stimulation signals: a numerically controlled oscillator; a digital to analog converter coupled to receive an output of the numerically controlled oscillator; and a transmitter coupled to receive an output of the digital to analog converter and coupled to output a stimulation signal of the plurality of stimulation signals to a drive electrode of the plurality of drive electrodes.

Some examples of the disclosure are directed to a system comprising: a touch sensor comprising: a first drive electrode; and a second drive electrode; and drive circuitry coupled to the first and second drive electrodes and operable to: drive the first drive electrode with a first stimulation signal having a first frequency; and drive the second drive electrode with a second stimulation signal having a second frequency, wherein a difference between the first frequency and the second frequency is a positive integer multiple of an integration frequency of the touch sensor. Additionally or alternatively to one or more of the examples disclosed above, in some examples, the touch sensor further comprises a plurality of sense electrodes capacitively coupled to the first and second drive electrodes, and wherein the system further comprises sense circuitry coupled to receive a plurality of touch signals from the plurality of sense electrodes and operable to detect a touch or hover event associated with the touch sensor based on the received plurality of touch signals. Additionally or alternatively to one or more of the examples disclosed above, in some examples, the system further comprises offset cancelation circuitry coupled between the drive circuitry and the sense circuitry, wherein the offset cancelation circuitry is operable to reduce an offset swing at a sense amplifier within the sense circuitry. Additionally or alternatively to one or more of the examples disclosed above, in some examples, the sense circuitry is operable to detect the touch or hover event associated with the touch sensor by: amplifying the plurality of touch signals; converting the amplified plurality of touch signals into a plurality of digital touch signals; demodulating the plurality of digital touch signals using a signal having the first frequency and a signal having the second frequency;

and integrating the demodulated plurality of digital touch signals over an integration time of the touch sensor, wherein the integration time of the touch sensor is an inverse of the integration frequency of the touch sensor. Additionally or alternatively to one or more of the examples disclosed above, in some examples, the system is included within a mobile phone, portable media player, tablet computer, or laptop computer.

Some examples of the disclosure are directed to a system comprising: a touch sensor comprising: a plurality of drive electrodes; and a sense electrode capacitively coupled to the plurality of drive electrodes; and drive circuitry coupled to the plurality of drive electrodes and operable to drive each of the plurality of drive electrodes with a stimulation signal having a different frequency, wherein the sense electrode is operable to generate a touch signal in response to the plurality of drive electrodes being driven by the stimulation signals, and wherein the touch signal comprises an interference component having a frequency corresponding to a difference in frequency between the frequencies of the stimulation signals. Additionally or alternatively to one or more of the examples disclosed above, in some examples, the system further comprises sense circuitry coupled to receive the touch signal from the sense electrode and operable to detect a touch or hover event associated with the touch sensor based on the received touch signal. Additionally or alternatively to one or more of the examples disclosed above, in some examples, the sense circuitry is operable to detect the touch or hover event associated with the touch sensor by: amplifying the touch signal; converting the amplified touch signal into a digital touch signal; demodulating the digital touch signal using each of the frequencies of the stimulation signals; and integrating the demodulated digital touch signals over an integration time of the touch sensor, wherein the integration time of the touch sensor is inversely proportional to a difference in frequency between the stimulation signals. Additionally or alternatively to one or more of the examples disclosed above, in some examples, after integrating the demodulated digital touch signals over the integration time of the touch sensor, the interference component is substantially zero. Additionally or alternatively to one or more of the examples disclosed above, in some examples, the frequencies of the stimulation signals are orthogonal.

Some examples of the disclosure are directed to a system comprising: a touch sensor comprising a plurality of drive electrodes; and drive circuitry coupled to the plurality of drive electrodes and operable to: drive a first set of the plurality of drive electrodes with a first plurality of stimulation signals, wherein each of the first plurality of stimulation signals has a first frequency, and wherein each of the first plurality of stimulation signals has a different phase offset; and drive a second set of the plurality of drive electrodes with a second plurality of stimulation signals, wherein each of the second plurality of stimulation signals has a second frequency, wherein each of the second plurality of stimulation signals has a different phase offset, and wherein the first frequency is orthogonal to the second frequency. Additionally or alternatively to one or more of the examples disclosed above, in some examples, a difference between the first frequency and the second frequency is inversely proportional to an integration time of the touch sensor. Additionally or alternatively to one or more of the examples disclosed above, in some examples, the touch sensor further comprises a plurality of sense electrodes capacitively coupled to the plurality of drive electrodes, and wherein the system further comprises sense circuitry coupled to receive a plurality of touch signals from the plurality of sense electrodes and operable to detect a touch or hover event associated with the touch sensor based on the received plurality of touch signals. Additionally or alternatively to one or more of the examples disclosed above, in some examples, the drive circuitry is operable to generate the first plurality of stimulation signals by multiplying a signal having the first frequency by a first matrix, and wherein the drive circuitry is operable to generate the second plurality of stimulation signals by multiplying a signal having the second frequency by a second matrix. Additionally or alternatively to one or more of the examples disclosed above, in some examples, the sense circuitry is operable to detect the touch or hover event associated with the touch sensor based on the received plurality of touch signals by: amplifying the plurality of touch signals; converting the amplified plurality of touch signals into a plurality of digital touch signals; demodulating the plurality of digital touch signals using demodulation signals having the first frequency and the second frequency; integrating the demodulated plurality of digital touch signals over an integration time of the touch sensor; and multiplying the integrated signals by an inverse of the first matrix and an inverse of the second matrix.

Some examples of the disclosure are directed to a method for stimulating a touch sensor, the method comprising: stimulating a plurality of sets of drive electrodes with a plurality of stimulation signals having orthogonal frequencies; receiving a plurality of touch signals generated in response to the plurality of stimulation signals; demodulating the plurality of touch signals using the orthogonal frequencies of the plurality of stimulation signals; and integrating the demodulated plurality of touch signals over an integration time of the touch sensor. Additionally or alternatively to one or more of the examples disclosed above, in some examples, each of the plurality of sets of drive electrodes consists of one drive electrode. Additionally or alternatively to one or more of the examples disclosed above, in some examples, each of the plurality of sets of drive electrodes comprises a plurality of drive electrodes, and wherein electrodes within each set of the plurality of sets of drive electrodes are driven by a plurality of stimulation signals having the same frequency and different phase offsets, and wherein frequencies of the stimulation signals used to drive each set of the plurality of sets of drive electrodes are orthogonal. Additionally or alternatively to one or more of the examples disclosed above, in some examples, the method further comprises multiplying the integrated signals by inverses of a plurality of matrices used to generate the stimulation signals. Additionally or alternatively to one or more of the examples disclosed above, in some examples, a difference between frequencies of the stimulation signals used to drive each set of the plurality of sets of drive electrodes is inversely proportional to the integration time of the touch sensor.

Although examples have been fully described with reference to the accompanying drawings, it is to be noted that various changes and modifications will become apparent to those skilled in the art. Such changes and modifications are to be understood as being included within the scope of the various examples as defined by the appended claims.

What is claimed is:
1. A system comprising:
drive circuitry operable to generate a plurality of stimulation signals having a plurality of orthogonal frequencies, each orthogonal frequency of the plurality of orthogonal frequencies being a different frequency, the plurality of stimulation signals for simultaneously driving a plurality of drive electrodes of a touch sensor, wherein frequencies of the plurality of orthogonal frequencies are separated by a frequency that is inversely proportional to an integration time of the touch sensor.

2. The system of claim 1, wherein the system further comprises:
the touch sensor, the touch sensor comprising:
the plurality of drive electrodes, wherein each of the plurality of drive electrodes is coupled to receive a different stimulation signal of the plurality of stimulation signals from the drive circuitry; and
a plurality of sense electrodes capacitively coupled to the plurality of drive electrodes; and
sense circuitry coupled to receive a plurality of touch signals from the plurality of sense electrodes and operable to detect a touch or hover event associated with the touch sensor based on the received plurality of touch signals.

3. The system of claim 2, wherein the sense circuitry comprises, for each of the plurality of sense electrodes:
an amplifier coupled to receive a touch signal of the plurality of touch signals from a sense electrode;
an analog to digital converter coupled to receive an output of the amplifier;
a plurality of demodulation mixers coupled to receive an output of the analog to digital converter, wherein the plurality of demodulation mixers are operable to demodulate the output of the analog to digital converter by multiplying the output of the analog to digital converter by a plurality of signals having frequencies corresponding to the plurality of orthogonal frequencies; and
a plurality of integrators, each integrator coupled to receive a demodulated signal output by one of the plurality of demodulation mixers and operable to integrate the received demodulated signal over the integration time of the touch sensor.

4. The system of claim 1, wherein the drive circuitry comprises, for each of the plurality of stimulation signals:
a numerically controlled oscillator;
a digital to analog converter coupled to receive an output of the numerically controlled oscillator; and
a transmitter coupled to receive an output of the digital to analog converter and coupled to output a stimulation signal of the plurality of stimulation signals to a drive electrode of the plurality of drive electrodes.

5. A system comprising:
a touch sensor comprising:
a first drive electrode; and
a second drive electrode; and
drive circuitry coupled to the first and second drive electrodes and operable to:
drive the first drive electrode with a first stimulation signal having a first frequency; and
drive the second drive electrode with a second stimulation signal having a second frequency, the second frequency different from the first frequency, wherein:
a difference between the first frequency and the second frequency is inversely proportional to an integration time of the touch sensor, and
the drive circuitry simultaneously drives the first electrode with the first stimulation signal and the second electrode with the second stimulation signal.

6. The system of claim 5, wherein the touch sensor further comprises a plurality of sense electrodes capacitively coupled to the first and second drive electrodes, and wherein the system further comprises sense circuitry coupled to receive a plurality of touch signals from the plurality of sense electrodes and operable to detect a touch or hover event associated with the touch sensor based on the received plurality of touch signals.

7. The system of claim 6, further comprising offset cancelation circuitry coupled between the drive circuitry and the sense circuitry, wherein the offset cancelation circuitry is operable to reduce an offset swing at a sense amplifier within the sense circuitry.

8. The system of claim 6, wherein the sense circuitry is operable to detect the touch or hover event associated with the touch sensor by:
amplifying the plurality of touch signals;
converting the amplified plurality of touch signals into a plurality of digital touch signals;
demodulating the plurality of digital touch signals using a signal having the first frequency and a signal having the second frequency; and
integrating the demodulated plurality of digital touch signals over the integration time of the touch sensor.

9. The system of claim 5, wherein the system is included within a mobile phone, portable media player, tablet computer, or laptop computer.

10. A system comprising:
a touch sensor comprising:
a plurality of drive electrodes; and
a sense electrode capacitively coupled to the plurality of drive electrodes; and
drive circuitry coupled to the plurality of drive electrodes and operable to simultaneously drive the plurality of drive electrodes with a plurality of stimulation signals, each stimulation signal of the plurality of stimulation signals having a different frequency, wherein:
the plurality of stimulation signals are spaced by a frequency that is inversely proportional to an integration time of the touch sensor,
the sense electrode is operable to generate a touch signal in response to the plurality of drive electrodes being driven by the stimulation signals, and
the touch signal comprises an interference component having a frequency corresponding to a difference in frequency between the frequencies of the stimulation signals.

11. The system of claim 10, wherein the system further comprises sense circuitry coupled to receive the touch signal from the sense electrode and operable to detect a touch or hover event associated with the touch sensor based on the received touch signal.

12. The system of claim 10, wherein the sense circuitry is operable to detect the touch or hover event associated with the touch sensor by:
amplifying the touch signal;
converting the amplified touch signal into a digital touch signal;
demodulating the digital touch signal using each of the frequencies of the stimulation signals; and
integrating the demodulated digital touch signals over the integration time of the touch sensor.

13. The system of claim 12, wherein after integrating the demodulated digital touch signals over the integration time of the touch sensor, the interference component is substantially zero.

14. The system of claim 10, wherein the frequencies of the stimulation signals are orthogonal.

15. A system comprising:
a touch sensor comprising a plurality of drive electrodes; and
drive circuitry coupled to the plurality of drive electrodes and operable to:
drive a first set of the plurality of drive electrodes with a first plurality of stimulation signals, wherein each of the first plurality of stimulation signals has a first frequency, and wherein each of the first plurality of stimulation signals has a different phase offset; and
drive a second set of the plurality of drive electrodes with a second plurality of stimulation signals, wherein each of the second plurality of stimulation signals has a second frequency different from the first frequency, wherein each of the second plurality of stimulation signals has a different phase offset, wherein:
the first frequency is orthogonal to the second frequency and a difference between the first frequency and the second frequency is inversely proportional to an integration time of the touch sensor, and
at least one drive electrode of the first set of drive electrodes and at least one drive electrode of the second set of drive electrodes are driven simultaneously.

16. The system of claim 15, wherein the touch sensor further comprises a plurality of sense electrodes capacitively coupled to the plurality of drive electrodes, and wherein the system further comprises sense circuitry coupled to receive a plurality of touch signals from the plurality of sense electrodes and operable to detect a touch or hover event associated with the touch sensor based on the received plurality of touch signals.

17. The system of claim 16, wherein the drive circuitry is operable to generate the first plurality of stimulation signals by multiplying a signal having the first frequency by a first matrix, and wherein the drive circuitry is operable to generate the second plurality of stimulation signals by multiplying a signal having the second frequency by a second matrix.

18. The system of claim 17, wherein the sense circuitry is operable to detect the touch or hover event associated with the touch sensor based on the received plurality of touch signals by:
amplifying the plurality of touch signals;
converting the amplified plurality of touch signals into a plurality of digital touch signals;
demodulating the plurality of digital touch signals using demodulation signals having the first frequency and the second frequency;
integrating the demodulated plurality of digital touch signals over the integration time of the touch sensor; and
multiplying the integrated signals by an inverse of the first matrix and an inverse of the second matrix.

19. A method for stimulating a touch sensor, the method comprising:
simultaneously stimulating a plurality of sets of drive electrodes with a plurality of stimulation signals having orthogonal frequencies, the plurality of stimulation signals comprising a first signal having a first frequency and a second signal having a second frequency different from the first frequency;
receiving a plurality of touch signals generated in response to the plurality of stimulation signals;
demodulating the plurality of touch signals using the orthogonal frequencies of the plurality of stimulation signals; and
integrating the demodulated plurality of touch signals over an integration time of the touch sensor, the integration time being inversely proportional to a difference between the first frequency and the second frequency by a positive integer multiple.

20. The method of claim 19, wherein each of the plurality of sets of drive electrodes consists of one drive electrode.

21. The method of claim 19, wherein each of the plurality of sets of drive electrodes comprises a plurality of drive electrodes, and wherein electrodes within each set of the plurality of sets of drive electrodes are driven by a plurality of stimulation signals having the same frequency and different phase offsets, and wherein frequencies of the stimulation signals used to drive each set of the plurality of sets of drive electrodes are orthogonal.

22. The method of claim 21, further comprising multiplying the integrated signals by inverses of a plurality of matrices used to generate the stimulation signals.

* * * * *